United States Patent [19]

Stiegelmeier

[11] 4,155,151

[45] May 22, 1979

[54] HEAVY DUTY IMPELLER AND METHOD OF FABRICATING THE SAME

[76] Inventor: Owen E. Stiegelmeier, 698 Wyleswood Dr., Berea, Ohio 44017

[21] Appl. No.: 829,563

[22] Filed: Aug. 31, 1977

Related U.S. Application Data

[63] Continuation-in-part of Ser. No. 656,539, Feb. 9, 1976, abandoned.

[51] Int. Cl.² .................... B23P 15/00; B21D 53/00
[52] U.S. Cl. .................... 29/156.8 CF; 113/116 D; 416/184; 416/199
[58] Field of Search .................. 416/184, 213 R, 199, 416/186; 29/156.8 CF, DIG. 48; 113/116 D; 72/63, 82

[56] References Cited

U.S. PATENT DOCUMENTS

| 1,003,849 | 9/1911 | Worth | 72/71 |
|---|---|---|---|
| 1,061,797 | 5/1913 | Worth | 72/82 |
| 1,112,324 | 9/1914 | Rice | 416/184 |
| 2,691,812 | 10/1954 | Misch | 29/156.8 FC |
| 2,807,871 | 10/1957 | Wagner et al. | 29/156.8 CF |
| 2,975,959 | 3/1961 | Foster | 416/184 |
| 3,021,803 | 2/1962 | Lacey, Jr. | 72/63 |
| 3,107,627 | 10/1963 | Clarke et al. | 29/156.8 CF |
| 3,222,765 | 12/1965 | Parent et al. | 29/159.1 |
| 3,236,341 | 2/1966 | Chopinet et al. | 228/173 |
| 3,260,443 | 7/1966 | Garnett et al. | 29/156.8 CF |
| 3,287,950 | 11/1966 | Grankowski | 72/63 |
| 3,298,444 | 1/1967 | Haas | 416/186 |
| 3,507,581 | 4/1970 | Jensen | 29/156.8 CF |
| 3,945,101 | 3/1976 | Rossmann et al. | 29/156.8 CF |
| 3,991,598 | 11/1976 | Kraft | 113/116 D |

FOREIGN PATENT DOCUMENTS

| 510266 | 4/1952 | Belgium | 416/231 |
|---|---|---|---|
| 1143291 | 4/1957 | France | 416/186 |
| 412381 | 6/1934 | United Kingdom | 416/184 |
| 445005 | 4/1936 | United Kingdom | 416/184 |

OTHER PUBLICATIONS

Hilton, B. Richard, *Welding Design and Processes*, Chapman & Hall, Ltd., London, 1950, pp. 54 and 55.

*Primary Examiner*—C. W. Lanham
*Assistant Examiner*—Daniel C. Crane
*Attorney, Agent, or Firm*—Maky, Renner, Otto & Boisselle

[57] ABSTRACT

A fabricated, heavy duty centrifugal pump impeller wherein the relatively heavy gauge shrouds are formed by plastic deformation such as by metal spinning, stretch forming or hydroforming. The hub is similarly formed and a plurality or regularly circumferentially spaced spiral vanes extend axially therebetween so that when the hub, blades and shroud are joined by welding or brazing, there is formed a heavy duty impeller having an axially extending inlet and a radially extending annular outlet. Following the fabrication, the impeller is finished and metallized.

16 Claims, 8 Drawing Figures

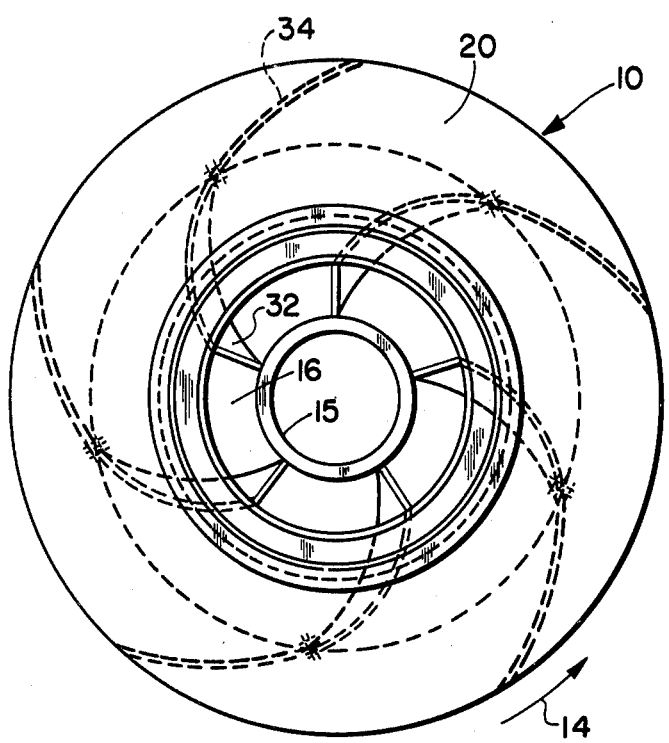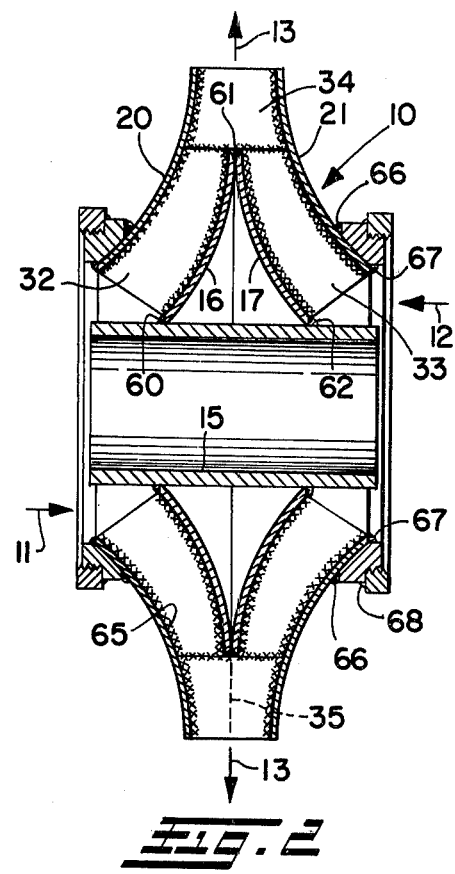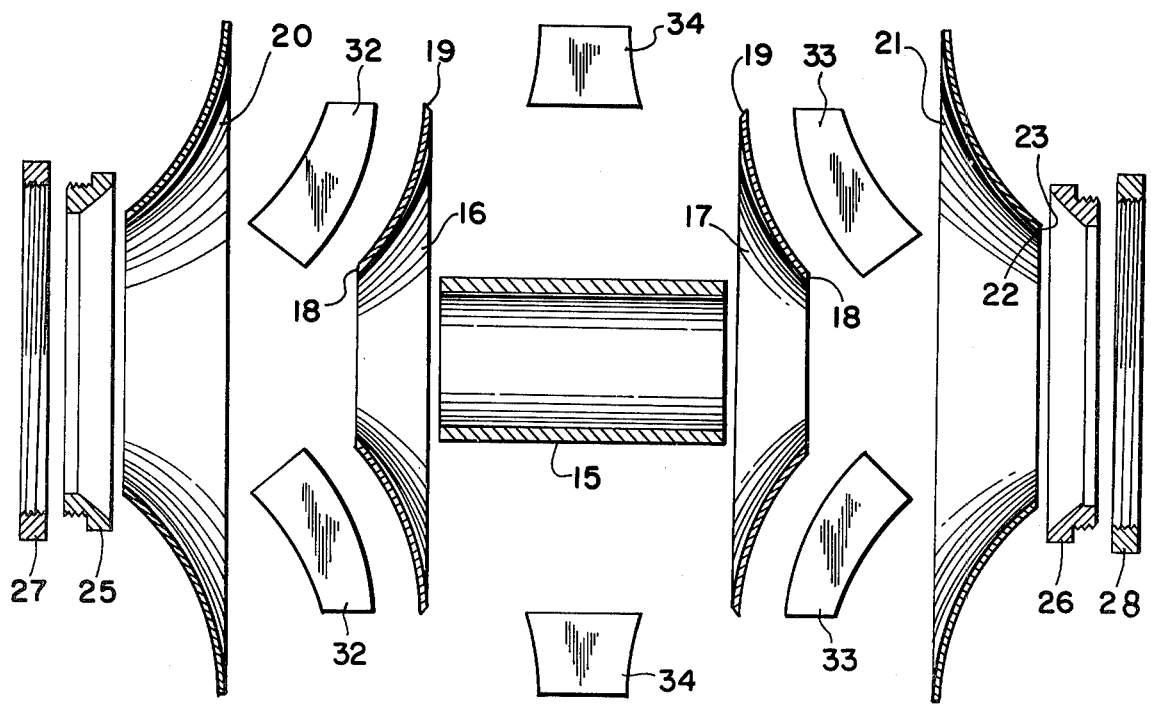

HEAVY DUTY IMPELLER AND METHOD OF FABRICATING THE SAME

CROSS-REFERENCE TO RELATED APPLICATION

This application is a continuation-in-part of copending U.S. Application Ser. No. 656,539, filed Feb. 9, 1976, now abandoned.

This invention relates generally as indicated to a heavy duty impeller and method of fabricating the same. Impellers, for large water pumps, for example, which are the rotating part of the pump, are normally cast. This has been considered a necessity in view of the size, weight, and complexity of the surfaces and openings therethrough. While smaller or lighter weight impellers used in connection with blowers or relatively small liquid pumps can readily be fabricated, this is not true with large heavy duty impellers such as those employed in large double or single-suction water pumps. A double-suction pump has opposed axial inlets while a single-suction pump has only one.

The weight of the impeller together with the thicknesses of the metal involved have not made such impellers susceptible to ready fabrication. Because of the increasing shortage of job shop foundries and their continuing unreliability as a source of supply, applicant has devised a method of fabricating such heavy duty impellers wherein the cost of the same is equal to or less than that of a cast impeller.

The present invention pertains particularly to large heavy duty impellers such as those employed in centrifugal pumps. The advantages of the present invention are particularly beneficial in the production of centrifugal shrouded type impellers and especially the double or single-suction type. They may weigh, for example, on the order of several hundred pounds, or more.

It is accordingly a principal object of the present invention to provide a fabricated impeller which does not require resort to complex casting techniques.

Another important object is the provision of a method of fabricating such heavy duty impellers wherein the shrouds and hub halves are plastically deformed by overstressing the material over a broad enough area that the material does not fracture.

Another important object is the provision of a shrouded centrifugal impeller wherein the relatively thick metal shrouds are formed by metal spinning techniques.

Another object is the provision of such impeller wherein the shrouds are formed by hydroforming or stretch forming.

Yet another important object is the provision of a fabricated impeller wherein the parts, following forming, can be secured together by welding followed by finishing and metallizing such that the appearance and performance is fully equivalent to that of a cast impeller.

For most impellers and particularly smaller size impellers, it is preferred that the outer vane part 34 not be positioned and tacked as indicated above, until the vane parts 32 and 33 are finished welded in the appropriate 1" passes set forth above. In this manner the finished hub and outer shrouds with the vane parts 32 and 33 tacked therebetween are removed from the jig for inspection and finish welding before the outer vane parts 34 are positioned, tacked, inspected, finish welded, and balanced in that order. Because of the significant spiral of the vanes, the placement of the vane part 34 last provides easier access to the inner vane parts 32 and 33 for finish welding. In the largest size impellers, the openings may be of sufficient size so as not to require the outer vane part be positioned last. It will be appreciated that the outer vane part may in fact be several separate parts positioned in the manner described from the hub outwardly.

A further object is the provision of a fabricated impeller wherein the parts are fabricated, shaped and size selected, so they can be assembled and welded together quickly and conveniently to form the complete impeller.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawings:

FIG. 1 is an end elevation of a double-suction impeller in accordance with the invention seen from the axis of the impeller;

FIG. 2 is a generally diametrical section of the assembled impeller taken through the axis thereof;

FIG. 3 is an exploded, somewhat schematic illustration of the parts of the impeller with only two of the five Y-shape vanes being shown schematically;

Figure 4:
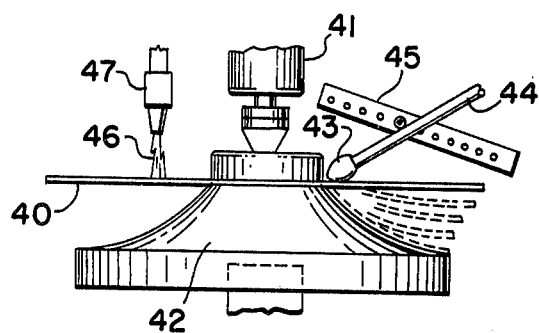
FIG. 4 is a schematic illustration of the manner in which the shrouds may be formed utilizing a metal spinning technique.
Figure 5:
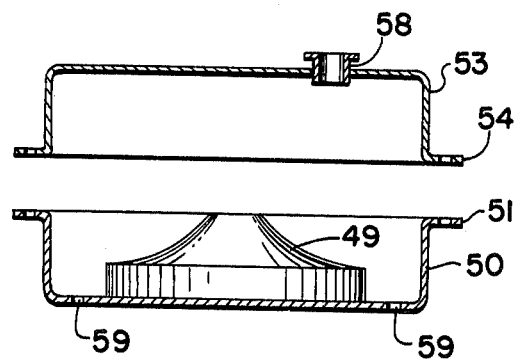
FIGS. 5–8 are schematic illustrations showing how the shrouds may be stretch formed utilizing a hydroforming technique.
Figure 6:
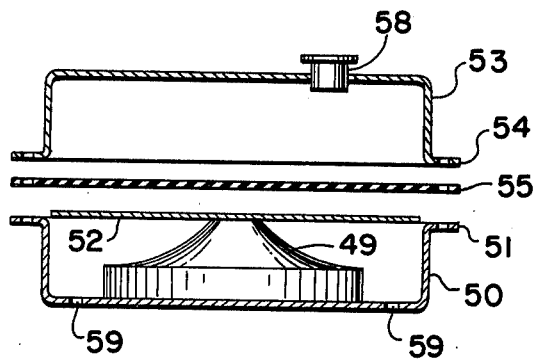

Referring first to FIGS. 1, 2 and 3, there is illustrated generally at 10 a fabricated impeller in accordance with the present invention, such impeller being of the centrifugal double-suction type. It will, however, be appreciated that much of the present invention is equally applicable to single-suction pumps. When rotated, fluid will be drawn axially into the impeller as indicated by the arrows 11 and 12 and expelled radially as indicated by the arrows 13. The impeller, of course, runs in the direction of arrow 14 in a suitable housing having axial inlets and a circumferential volute outlet passage.

Referring initially to FIGS. 2 and 3, it will be seen that the impeller of the present invention comprises a tubular hub center member 15, which may be fabricated from a pipe section, and shaped hub halves 16 and 17 which are identical in form. Each of the hub halves is provided with a center aperture to be assembled on the hub center 15. The O.D. of the hub halves, indicated at 19, may be provided with opposed 45° bevels to facilitate fabrication as set forth hereinafter. When thus assembled, the hub center 15 togehter with the hub halves 16 and 17 form the hub of the impeller.

The hub center 15, of course, receives the impeller drive shaft which is drivingly connected thereto, generally by a key and keyway.

Of the same general configuration as the hub halves 16 and 17, but larger in size, are shrouds 20 and 21. Such shrouds have a larger diameter I.D. or interior opening 22, such opening being formed by axially facing end walls 23.

To the outside of the shrouds 20 and 21 there is secured transition rings 25 and 26 to which impeller seal rings 27 and 28 are threadedly connected.

The equally spaced spirally formed vanes indicated at 30 are each formed of several parts. There may be approximately five to seven vanes. They must, of course, be equally spaced circumferentially, both at their inner and outer ends.

Such blades extend axially between the shrouds beyond the hub and also axially between the shroud and the inner hub half. For double-suction impeller such as the one illustrated, the vanes, when assembled, are in the form of the Y illustrated. Such vanes may be formed of two pieces, or as illustrated in FIGS. 2 and 3, preferably of three pieces. The three pieces comprising a single vane are illustrated at 32, 33 and 34 in FIG. 3. Because of the spiral shaping of the vanes, such vane parts are illustrated greatly foreshortened from their actual length. The vane part 32 extends between the shroud 20 and the inner hub half 16 while the vane part 33 extends between the shroud 21 and the inner hub half 17. The vane part 34 which constitutes the tip of the vane beyond the hub extends between the shrouds 20 and 21. If only two vane parts are employed, the parts 32 and 33 would be extended and seam welded together along the dotted line indicated at 35 in FIG. 2.

The shroud and inner hub halves will be formed as described below in connection with the embodiments of FIGS. 4 through 8. The blade parts, after being blanked or cut to the desired shape, are die formed or press formed to the required spiral shape. The hub center, of course, may be made from a piece of pipe and the interior rounded, although not necessarily finished, for centering purposes as hereinafter described.

Both the hub halves and the shrouds may be formed by the technique illustrated in FIGS. 4 through 8. The preferred method of forming such parts is by metal spinning as illustrated in FIG. 4. The circular blank or disk 40 is held in a metal spinning chuck 41, one portion of which comprises the pattern 42. A spinning tool 43 journalled on mandrel 44 is held by steady rest or positioning tool shown schematically at 45 such that it can be forced against the blank on the opposite side of the pattern 42. In practice, a fluid motor with controlled pressure will exert the required force. The spinning tool 43 is traversed radially of the spinning blank. For larger gauges, it is preferred to apply heat to the blank as illustrated by the flame 46. The source of the flame, illustrated as a torch 47, may be moved both axially and radially of the spinning blank. Surprisingly, it has been found that metal thicknesses up to 9.525mm can be successfully formed with the metal spinning technique illustrated. The normal thickness of the hub halves and shrouds may vary from 3.1750mm to approximately 9.525mm.

Figure 7:
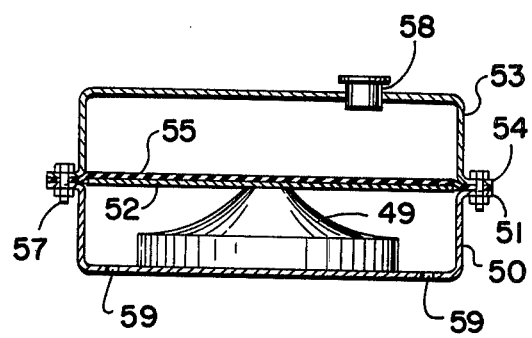
Figure 8:
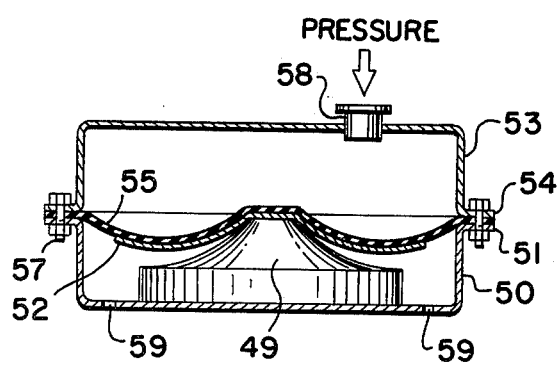

In FIGS. 5 through 8 there is illustrated another method of forming such hub halves and shrouds, such method being by hydroforming or stretch forming. A pattern 49 is placed in the bottom of a drag or container 50 which is provided with a peripheral flange 51. A blank 52 is positioned over the pattern and centered with respect thereto. A cope 53 which has a similar configuration to the drag 50 is provided with a peripheral flange 54. A diaphragm 55 is positioned between the opposed flanges 54 and 51 over the top of the centered blank 52. The cope and drag is then secured together as seen in FIG. 7 by suitable clamping fasteners 57. Fluid under pressure such as water, is then applied to the cope through the inlet 58 and pressure is built up until the blank collapses over the pattern 49 as indicated in FIG. 8. The drag is provided with vent openings as indicated at 59. When the blank has achieved its final position against the pattern, the pressure is relieved, the parts separated, and the shaped blank is removed. After shaping, the blanks may be cut or turned to the desired accuracy for both the O.D. and I.D. as indicated in FIG. 3.

ASSEMBLY

After the required parts are shaped and formed, they may be assembled in the following manner. The two hub halves are positioned on the hub center equidistant from the ends. The parts are secured together by annular fillet weld 60, 61 and 62 seen in FIG. 2. The fillet welds 60 and 62 may be placed in the right angle corners between the walls 18 and the O.D. of the hub center while the fillet weld 61 is placed in the right angle corner formed by the opposed bevels 19.

With the hub thus preassembled, one of the shrouds, for example, 21, is supported horizontally with its axis vertical on a jig. The van parts 33 are then positioned on the shroud and lightly tack welded in place. The preassembled hub is then brought down on the vane parts 33 with a special plug or pilot projecting into the rounded hole on the hub center. The hub is then tack welded to the vane parts 33 and additionally the vane parts 34 and 32 are lightly tacked into place. Finally, the outer shroud 20 is tacked to the vane parts 32 and 34. After being tack welded assembled, the impeller is removed from the jig for inspection to ascertain that the vanes are properly positioned and, more importantly, properly spaced from each other both at their inner and outer ends. If the assembly is properly centered and assembled, the parts are then welded in passes of about 1 inch at a time, such welding passes not normally being adjacent to each other to avoid distortion.

Such welding passes are indicated generally at 65.

For most impellers and particularly smaller size impellers, it is preferred that the outer vane part 34 not be positioned and tacked as indicated above, until the vane parts 32 and 33 are finished in the appropriate 1 inch passes set forth above. In this manner the finished hub and outer shrouds with the vane parts 32 and 33 tacked therebetween are removed from the jig for inspection and finish welding before the outer vane parts 34 are positioned, tacked, inspected, finish welded, and balanced in that order. Because of the significant spiral of the vanes, the placement of the vane part 34 last provides easier access to the inner vane parts 32 and 33 for finish welding. In the largest size impellers, the openings may be of sufficient size so as not to require the outer vane part be positioned last. It will be appreciated that the outer vane part may in fact be several separate parts positioned in the manner described from the hub outwardly.

After welding, the inlet eyes or the I.D. of the shrouds are trued up in a lathe on an expanding mandrel and the final step in assembly is to position on and weld the transition rings 25 and 26. This may be accomplished by annular fillet welds indicated at 66 and 67, the latter being placed in the right angle corner between the end wall 23 and the I.D. of the transition ring. The seal rings are then threaded on the transition rings and such rings may be brazed as indicated at 68, depending upon the particular material thereof. Such rings may be stainless steel or bronze, and if bronze, brazing may be employed.

It is preferred to employ a M.I.G. (metal inert gas) welding technique and hard to reach places may be done by a flux coated electrode welding process. Depending upon the types of metals involved, a T.I.G. (tungsten inert gas) process may be employed. For smaller impellers, furnace brazing may be employed in lieu of welding.

After welding, the impeller is finished and metallized.

The shrouds and hub, when assembled with the spiral vanes therebetween, have the complex shape of generally conjugate hyperboloids, but such shapes can readily be obtained with the techniques disclosed, even for the relatively heavy gauge metals require for heavy duty impellers. However, with the techniques disclosed, an impeller of low cost can be obtained.

With the processes and fabrication techniques disclosed, an impeller is provided having substantially all of the appearance of a cast impeller, but some significant improvements over a cast impeller. For example, the impeller of the present invention is nearly always repairable. The pumps of the type for which such impellers are used may ingest all kinds of trash. The impeller then simply acts as a grinder. If a blade or vane is broken it is thrown out of balance. A casting, generally speaking, is not normally repaired, but is scrapped. Its value then is about $45.00 per ton. Also, unexpectedly, the fabricated impeller of the present invention has more capacity per given shroud separation and given diameter. This is apparently because the shrouds, vanes and fillets are smaller than on castings. The fabricated impeller of the present invention is also more accurate and has better uniformity than a casting. Cores and patterns in a casting of the type and complexity involved tend to shift and such castings are not normally uniformly precise. Moreover, because of the economics in job shop foundries, supply of castings is unreliable. When a large pump is down, it can be an expensive proposition. With a casting there is less flexibility in design since design is limited to the patterns available, and such tooling is considerably more costly than the tooling required for the present invention. The impeller of the present invention is lighter in weight requiring less horsepower or energy consumption on start-up. The fabricated impeller of the present invention can be made of substantially any metal or alloy such as stainless steel which may be used in pumping corrosive liquids. For a reason not fully understood, castings tend to wear out faster. This is apparently due to porosity of the casting resulting in explosive expansion in areas of cavitation. Additionally, the impeller of the present invention is easier to balance. Weights may readily be welded on where desired. With a casting, heavy areas must be ground off. Finally, the cost of the impeller of the present invention is significantly less than the cost of a comparable casting.

I claim:

1. A method of fabricating a heavy duty pump impeller of the double-suction type having back-to-back hub halves forming a hub and two shaped shrouds with spiral vanes between corresponding hub halves and shrouds, said method comprising the steps of shaping the shrouds to the desired hyperboloid configuration by plastic deformation of planar circular blanks of heavy gauge metal, shaping the vanes to the desired spiral form by forming, each vane being formed of at least two parts including an inner part and an outer part, welding the hub halves, inner vane parts and shrouds together, and then inserting the outer vane parts and welding the same in place to form a spiral continuation of the inner vane parts.

2. A method as set forth in claim 1 wherein the shroud is shaped by metal spinning from such planar circular blanks of heavy gauge metal.

3. A method as set forth in claim 2 wherein the blank is heated as it is being shaped.

4. A method as set forth in claim 1 wherein the hub is shaped in the same manner as the shroud and a tubular center is secured to the I.D. of the shaped hub.

5. A method as set forth in claim 4 wherein the shroud and hub are shaped by hydroforming by placing such planar circular blank between a pattern and fluid pressurized diaphragm.

6. A method of fabricating a heavy duty pump impeller of the double-suction type having two shaped shrouds and back-to-back hub halves forming a hub with spiral vanes between corresponding shrouds and hub halves, said method comprising the steps of shaping the shrouds and hub halves to the desired hyperboloid configuration by plastic deformation of planar circular blanks of heavy gauge metal, shaping the vanes to the desired spiral form by forming, and then welding the vanes in place between the corresponding hub halves and the shrouds, each vane including inner and outer parts forming a spiral continuation of each other, the outer part extending beyond the shaped hub and being welded in place after the inner part is welded in place.

7. A method as set forth in claim 6 wherein the hub and shroud are shaped by metal spinning from circular blanks of heavy gauge metal.

8. A method as set forth in claim 6 wherein the shroud and hub are shaped by hydroforming by placing such planar circular blank between a pattern and a fluid pressurized diaphragm.

9. A method of fabricating a heavy duty pump impeller of the double-suction type including two symmetrically positioned back-to-back hub halves forming a hub and two shaped shrouds with spiral vanes between corresponding hub halves and shrouds, said method comprising the steps of shaping the shrouds to the desired hyperboloid configuration by plastic deformation of planar circular blanks of heavy gauge metal, shaping the vanes to the desired spiral form by forming, each vane being formed of at least two parts including an inner part and an outer part, shaping the hub halves in the same manner as the shrouds and securing a tubular center to the inner diameter of the shaped hub halves, providing the outer diameter of the shaped hub halves with opposed bevels forming a substantially right angle groove thereabout when back-to-back, welding the hub halves, inner vane parts and shrouds together, such hub halves being fillet welded in such groove, and then inserting the outer vane parts and welding the same in place to form a spiral continuation of the inner vane parts.

10. A method as set forth in claim 9 wherein the hub is thus formed prior to a shroud, inner vane parts, such hub, and opposite shroud being tack welded together in a jig before being finally welded together.

11. A method as set forth in claim 9 including the step of trueing the I.D. of the shrouds on a common center, and then welding transition rings thereto.

12. A method of fabricating a heavy duty pump impeller of the double-suction type having two shaped shrouds and two symmetrically positioned back-to-back hub halves forming a hub with spiral vanes between corresponding shrouds and hub halves, said method comprising the steps of shaping the shrouds and hub halves to the desired hyperboloid configuration by plastic deformation of planar circular blanks of heavy gauge metal, the outer diameter of the shaped hub halves being provided with opposed bevels forming a substantially right angle groove thereabout when back-to-back, shaping the vanes to the desired spiral form by forming and then welding the vanes in place between the respective hub halves and shrouds and welding the hub halves together with a fillet weld in such groove, each vane including inner and outer parts forming a spiral continuation of each other, the outer part extending beyond the shaped hub.

13. A method as set forth in claim 12 wherein the hub is thus formed prior to a shroud, inner vane parts, such hub, and opposite shroud being tack welded together in a jig before being finally welded together.

14. A method as set forth in claim 13 wherein each vane includes two inner vane parts and at least one outer vane part forming a Y-shape vane, the outer vane part being positioned and welded in place after final welding of the inner vane parts to the hub and shrouds.

15. A method as set forth in claim 14 including the steps of trueing the I.D. of the shrouds on a common center and then welding transition rings thereto.

16. A method as set forth in claim 12 including the step of securing a tubular center to the I.D. of the shaped hub halves, the I.D. of each hub half including an end face extending at right angles to the axis of the tubular center so that such hub halves may be fillet welded thereto.

* * * * *